United States Patent [19]
Sapiano

[11] 3,791,410
[45] Feb. 12, 1974

[54] LIQUID MIXING DEVICE

[75] Inventor: John Sapiano, Warren, Mich.

[73] Assignee: The Raymond Lee Organization, Inc., New York, N.Y.

[22] Filed: July 14, 1972

[21] Appl. No.: 271,750

[52] U.S. Cl.................. 137/604, 137/567, 239/318
[51] Int. Cl............................................. F16k 19/00
[58] Field of Search ........ 137/268, 604, 205.5, 567; 239/313, 315, 317, 318

[56] References Cited
UNITED STATES PATENTS

| | | | |
|---|---|---|---|
| 2,758,877 | 8/1956 | Gleason | 137/604 X |
| 2,709,448 | 5/1955 | Rudnick et al. | 137/604 X |
| 3,260,464 | 7/1966 | Harant | 239/318 |
| 2,231,782 | 2/1941 | Thompson | 239/313 X |
| 3,029,837 | 4/1962 | Neudeck | 239/318 X |

FOREIGN PATENTS OR APPLICATIONS

| | | | |
|---|---|---|---|
| 574,685 | 4/1959 | Canada | 239/317 |

Primary Examiner—Robert G. Nilson
Attorney, Agent, or Firm—Daniel Jay Tick

[57] ABSTRACT

An outer container has an inlet in one wall for admitting a first liquid into the outer container under pressure and an outlet in another wall for releasing liquid from the outer container. An inner container formed in the outer container has some walls in common with walls of the outer container and some walls in the outer container. The inner container has an inlet in a common wall for admitting a second liquid into the inner container and an outlet in a wall in the outer container for releasing the second liquid from the inner container into the outer container. A regulatable valve in the outlet of the inner container controls the volume of the second liquid released from the inner container into the outer container.

3 Claims, 2 Drawing Figures

PATENTED FEB 12 1974          3,791,410

3,791,410

LIQUID MIXING DEVICE

DESCRIPTION OF THE INVENTION

The present invention relates to a liquid mixing device.

The principal object of the invention is to provide a new and improved liquid mixing device which is of simple structure, but operates with efficiency, effectiveness and reliability.

Figure 1:
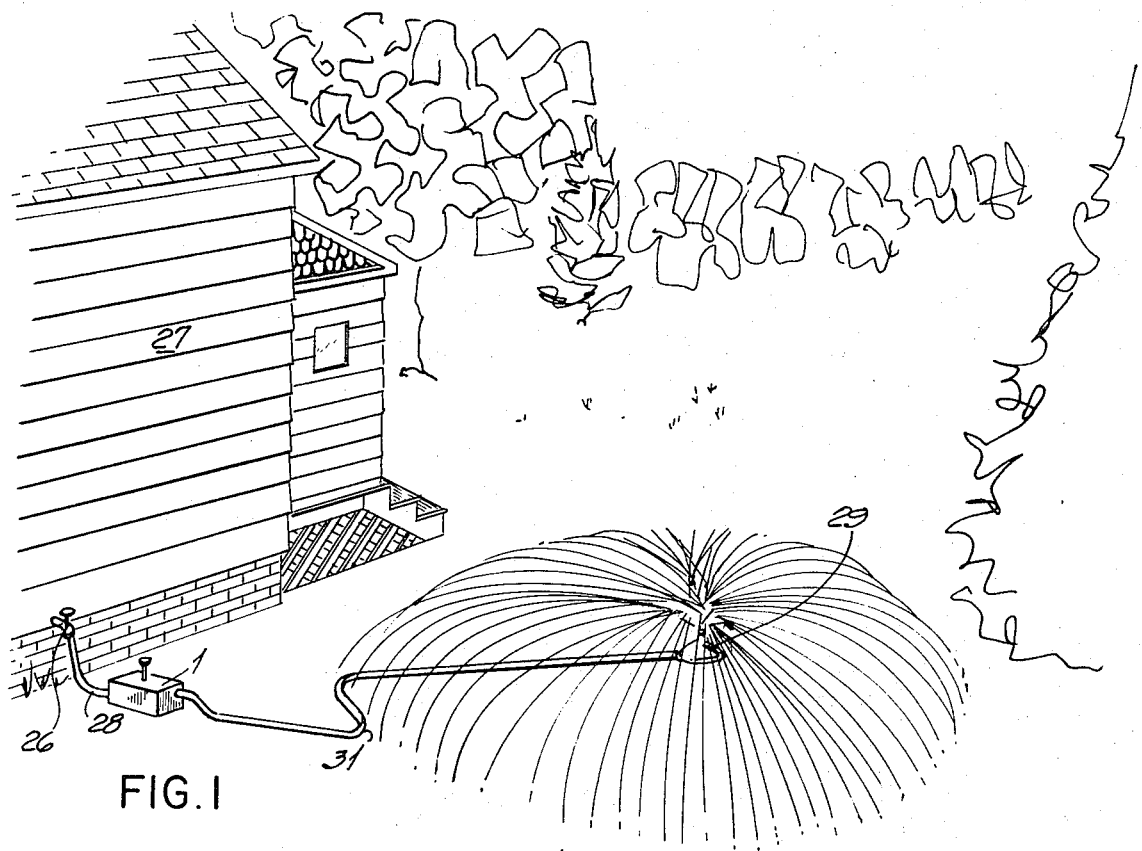
Figure 2:
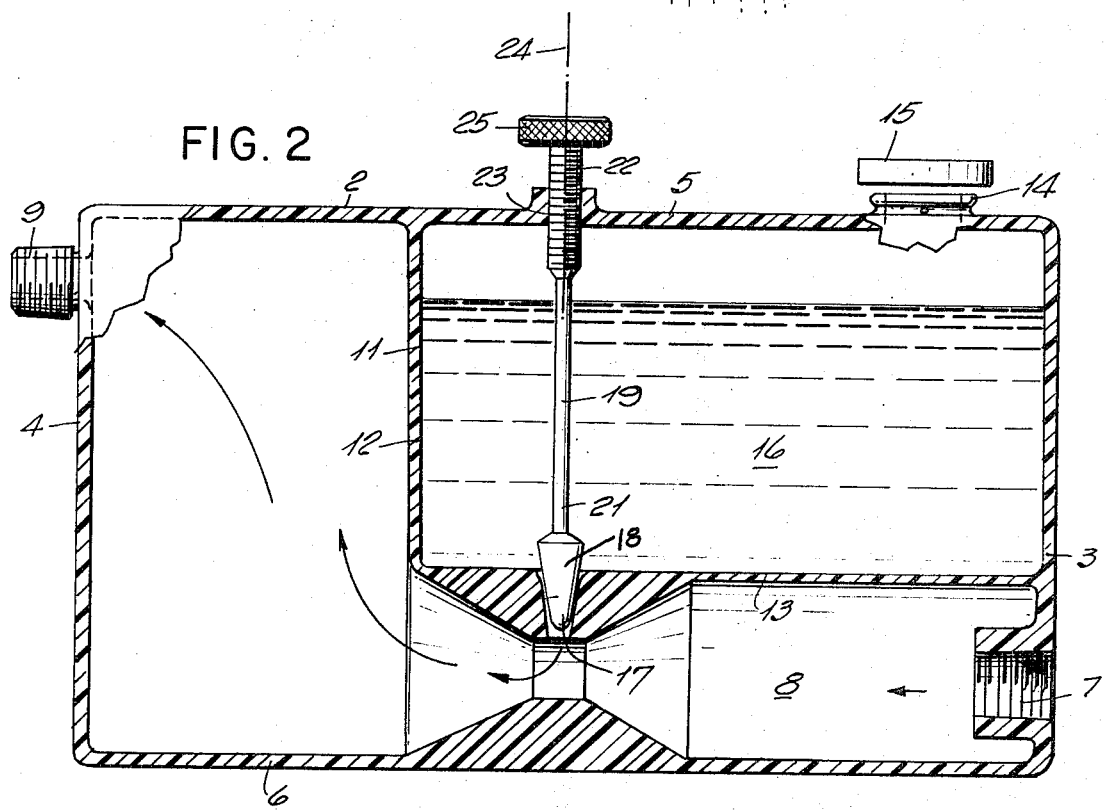

In order that the invention may be readily carried into effect, it will now be described with reference to the accompanying drawing, wherein:

FIG. 1 is a perspective view of an embodiment of the liquid mixing device of the invention in use in mixing lawn water with lawn chemicals; and FIG. 2 is a view, partly in section, of an embodiment of the liquid mixing device of the invention.

The liquid mixing device of the invention mixes a first liquid with a second liquid. The first and second liquids may comprise any desired liquids which are to be mixed. Thus, the first liquid may comprise, for example, water, and the second liquid may comprise, for example, a lawn chemical solution such as, for example, fertilizer, weed killer, insecticide, or the like.

The liquid mixing device 1 of the invention comprises an outer container 2, having walls 3, 4, 5 and 6 and other walls, not shown in the FIGS. An inlet 7 is provided in the wall 3 for admitting a first liquid 8 into the outer container 2 under pressure. An outlet 9 is provided in the wall 4 for releasing liquid from the outer container 2. Each of the inlet 7 and the outlet 9 is a standard garden hose coupling connection, although in the FIGS. the inlet is shown as internally threaded and the outlet is shown as externally threaded. The outlet 9 is positioned higher than the inlet 7 in order to insure the desired mixing of liquids in the outer container 2.

An inner container 11 is formed in the outer container 2. The inner container 11 and the outer container 2 have the walls 3 and 5 in common with each other. The inner container 11 also has walls 12 and 13 and other walls, not shown in the FIGS. The inner container 11 has an inlet 14 in the common wall 5. The inlet 14, which is preferably covered by a cap 15, admits a second liquid 16 into the inner container 11. The inner container 11 also has an outlet 17 in the wall 13 for releasing the second liquid 16 from said inner container into the outer container 2.

A regulatable valve is provided in the outlet 17 of the inner container 11 for controlling the volume of the second liquid 16 released from the inner container 11 into the outer container 2. The outlet 17 comprises a valve seat. The regulatable valve comprises a valve head 18. A positioning device affixed to the valve head 18 positions said valve head in the valve seat 17 to a desired extent.

The positioning device of the regulatable valve comprises a rod 19 having one end 21 affixed to the valve head 18. The other end 22 of the rod 19 is threadedly coupled to an internally threaded control aperture 23 formed in the common wall 5. The end 22 of the rod 19 extends outside the inner and outer containers 11 and 2. Rotation of te rod 19 about its axis 24 moves the valve head 18 correspondingly in axial directions.

A knurled head 25 is affixed to the end 22 of the rod 19 to facilitate manual control of the regulatable valve.

The walls of the outer and inner containers 2 and 11 preferably comprise translucent plastic material to permit observation of the operation of the regulatable valve. If the walls comprise opaque plastic material, a clear plastic window is provided in the wall adjacent the regulatable valve to permit visual observation thereof.

In FIG. 1 the inlet 7 of the outer container 2 (not shown in FIG. 1) is connected to a water faucet 26 of a house 27 via a section 28 of garden hose. A lawn sprinkler 29 is connected to the outlet 9 of the outer container 2 via a garden hose 31.

While the invention has been described by means of specific examples and in specific embodiments, I do not wish to be limited thereto, for obvious modifications will occur to those skilled in the art without departing from the spirit and scope of the invention.

I claim:

1. A liquid mixing device for mixing a first liquid with a second liquid, said device comprising an outer container having walls, an inlet in one wall for admitting a first liquid into the outer container under pressure and an outlet in another wall for releasing liquid from the outer container;

an inner container formed in the outer container and having some walls in common with walls of the outer container and some walls in the outer container, the inner container having an inlet in a common wall for admitting a second liquid into the inner container and an outlet in a wall in the outer container for releasing the second liquid from the inner container into the outer container, the outlet of the inner container comprising a valve seat;

an internally threaded control aperture formed in a common wall; and regulatable valve means in the outlet of the inner container for controlling the volume of the second liquid released from the inner container into the outer container, the regulatable valve means comprising a valve head and positioning means affixed to the valve head for positioning the valve head in the valve seat to a desired extent, the positioning means of the regulatable valve means comprising a rod having one end affixed to the valve head and the other end threadedly coupled to the control aperture of the common wall and extending outside the containers in a manner whereby rotation of the rod about its axis moves the valve head correspondingly in axial directions.

2. A liquid mixing device as claimed in claim 1, wherein the positioning means of the regulatable valve means further comprises a knurled head on the other end of the rod to facilitate manual control of the regulatable valve means.

3. A liquid mixing device as claimed in claim 2, wherein the walls of the outer and inner containers comprise translucent plastic material to permit observation of the operation of the regulatable valve means.

* * * * *